United States Patent
Al-Safran et al.

(10) Patent No.: US 11,905,458 B2
(45) Date of Patent: Feb. 20, 2024

(54) LOSS CIRCULATION MATERIALS FOR HIGH PRESSURE FORMATIONS

(71) Applicant: SAUDI ARABIAN OIL COMPANY, Dhahran (SA)

(72) Inventors: Ali Al-Safran, Dhahran (SA); Khawlah A. Alanqari, Al-Khubar (SA); Vikrant Wagle, Dhahran (SA); Abdullah S. Al-Yami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/675,747

(22) Filed: Feb. 18, 2022

(65) Prior Publication Data

US 2023/0295484 A1  Sep. 21, 2023

(51) Int. Cl.
*C09K 8/512* (2006.01)
*E21B 21/00* (2006.01)
*C09K 8/516* (2006.01)

(52) U.S. Cl.
CPC .............. *C09K 8/512* (2013.01); *C09K 8/516* (2013.01); *E21B 21/003* (2013.01)

(58) Field of Classification Search
None
See application file for complete search history.

(56) References Cited

U.S. PATENT DOCUMENTS

| | | |
|---|---|---|
| 4,515,216 A * | 5/1985 | Childs ................... E21B 21/003 106/803 |
| 9,828,293 B2 | 11/2017 | Yadav et al. |
| 10,005,930 B2 | 6/2018 | Reddy |
| 10,081,755 B2 | 9/2018 | Ballard |
| 10,144,858 B2 | 12/2018 | Kennedy et al. |
| 10,696,888 B2 | 6/2020 | Al-Yami et al. |
| 10,781,356 B2 | 9/2020 | Alsaihati et al. |
| 11,015,108 B1 | 5/2021 | Alanqari et al. |
| 2007/0259790 A1* | 11/2007 | Miller ....................... C09K 8/32 507/131 |
| 2013/0109783 A1* | 5/2013 | Chatterji ................ C09K 8/428 523/130 |
| 2017/0174975 A1* | 6/2017 | De Stefano ............. C09K 8/36 |
| 2017/0247296 A1* | 8/2017 | Salla ........................ C04B 26/02 |
| 2020/0071595 A1 | 3/2020 | Al-Yami et al. |
| 2020/0071598 A1* | 3/2020 | Al-Yami .................. C09K 8/501 |
| 2021/0189219 A1 | 6/2021 | Alanqari et al. |
| 2022/0267664 A1* | 8/2022 | Al-Safran ............. C09K 8/5045 |

* cited by examiner

*Primary Examiner* — Andrew Sue-Ako
(74) *Attorney, Agent, or Firm* — Osha Bergman Watanabe & Burton LLP

(57) ABSTRACT

Lost circulation material (LCM) compositions may include a resin; an emulsifier selected from the group consisting of ethoxylated phenol, sodium salt of modified tall oil fatty amide, carboxylic acid terminated fatty polyamide, modified amidoamine, tall oil fatty acid, oxidized tall oil fatty amidoamine, ether carboxylic acid, and combinations thereof; a crosslinker, a cementitious and/or weighting agent; a retarder; a dispersant; and a silicon-based defoamer. The LCM compositions may have a thickening time of from about 3 hours than about 6 hours by reaching a Bearden consistency of 100 Bc. Methods of eliminating or reducing lost circulation in a lost circulation zone from a well may include introducing these LCM compositions into the well.

14 Claims, 4 Drawing Sheets

LOSS CIRCULATION MATERIALS FOR HIGH PRESSURE FORMATIONS

BACKGROUND

Extracting hydrocarbons from subterranean formations requires drilling a wellbore extending from the surface to a location below the surface to provide access to these hydrocarbon-bearing subterranean formations. Specialized drilling techniques and materials may be utilized to form the wellbore hole and extract the hydrocarbons. Specialized materials utilized in drilling operations may include drilling fluids and materials for sealing the annulus, located between the outer casing and the inner wall of the wellbore. Such drilling fluids may be formulated for specific downhole conditions.

While drilling a wellbore, cementing the wellbore, or both, lost circulation zones may be encountered and may result in loss of drilling fluid or cementing compositions. In a lost circulation zone, the drilling fluids, cement compositions, or other fluids flow out of the wellbore and into the surrounding formation. Lost circulation zones may result in an increased cost of the well from the increased material costs to replace lost fluids and the downtime to remediate the lost circulation zone. Lost circulation zones may be remediated by introducing a lost circulation material into the lost circulation zone to seal off the lost circulation zone to prevent further fluid loss. Conventional lost circulation materials (LCMs) can include bridging material, fibrous material, flaky material, and other materials having different particle sizes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, lost circulation material (LCM) compositions are provided. The LCM compositions may include a resin; an emulsifier selected from the group consisting of ethoxylated phenol, sodium salt of modified tall oil fatty amide, carboxylic acid terminated fatty polyamide, modified amidoamine, tall oil fatty acid, oxidized tall oil fatty amidoamine, ether carboxylic acid, and combinations thereof; a crosslinker; a cementitious and/or weighting agent; a retarder; a dispersant; and a silicon-based defoamer. The LCM compositions may have a thickening time of from about 3 hours than about 6 hours by reaching a Bearden consistency of 100 Bc.

In another aspect, methods of eliminating or reducing lost circulation in a lost circulation zone from a well are provided. The methods may include introducing these LCM compositions into the well.

Other aspects and advantages of the claimed subject matter will be apparent from the following description and the appended claims.

DETAILED DESCRIPTION

Figure 1:
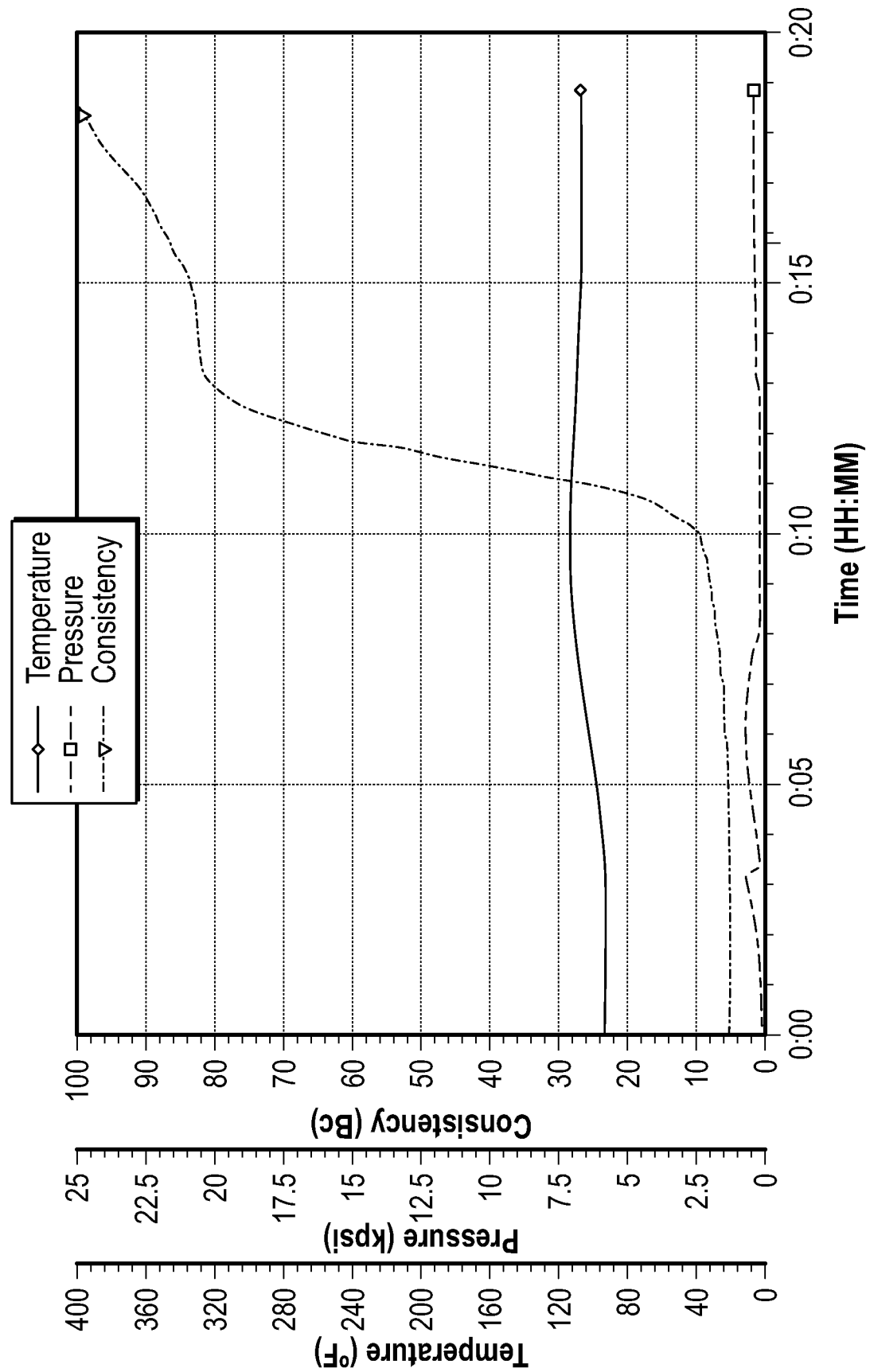
FIG. 1 illustrates the thickening times measured in the LCM composition of Example 1.

When a lost circulation zone is encountered during drilling or cementing a wellbore, fluids in the wellbore flow from the wellbore into the subterranean formation, resulting in loss of these fluids. These fluids can include but are not limited to drilling fluids, sealing compositions, spacer fluids, wash fluids, preflush fluids, or displacement fluids. In some instances, lost circulation may be caused by the natural state of the subterranean formation through which the drilling passes. For example, the subterranean formation may be naturally fractured or may be an unconsolidated formation, such as but not limited to gravel, sand, pea, or combinations of these. Alternatively, in other circumstances, the hydrostatic pressure of the fluids in the wellbore may be greater than the fracture gradient of the subterranean formation, which may cause at least some breakdown of the pores in the formation. If the pores in the formation breakdown, then the pores may become large enough to reduce the resistance to flow of fluids into the pores, which may result in the formation receiving fluids from the wellbore instead of resisting the flow of these fluids into the formation.

Lost circulation zones may be remediated by introducing an LCM into the subterranean formation in the lost circulation zone to seal the lost circulation zone from the wellbore by blocking flow pathways in the subterranean formation and preventing flow of fluids from the wellbore into the subterranean formation. Specific examples of conventional LCMs may include but are not limited to cements, paper, cottonseed hulls, nutshells, or combinations of these. These materials may be able to remediate many lost circulation zones by forming a layer of solids over the formation at the lost circulation zone. The LCM may be injected into the lost circulation zone or squeezed into the lost circulation zone. While these materials may be effective at mediating many lost circulation zones, they may not be effective for use as LCM in high-injectivity zones.

One or more embodiments of the present disclosure relate to LCM compositions and methods of using these LCM compositions in high pressure formations to reduce or eliminate lost circulation. The LCM compositions are based on emulsified resins having controlled rheology properties and setting time and the methods using these LCM compositions allow for the sealing of lost circulation zones in high pressure formations or under high injectivity conditions. The LCM compositions according to one or more embodiment may include a resin, an emulsifier, a crosslinker operable to cure the resin, and an optional cementitious and/or weighting material, a retarder, a dispersant, and a silicon-based defoamer. The LCM compositions may have a thickening time of from about 3 hours than about 6 hours by reaching a Bearden consistency of 100 Bc. The LCM compositions may have a thickening time of from about 3 hours than about 5 hours by reaching a Bearden consistency of 70 Bc. The LCM composition may be capable of being injected through a drill bit of a drill string into the lost circulation zone, thus resulting in sealing the lost circulation zones in wellbores in high pressure formations or in high-injectivity zones.

In this disclosure, the term "hydrocarbon-bearing formation" refers to a subterranean geologic region containing hydrocarbons, such as crude oil, hydrocarbon gases, or both, which may be extracted from the subterranean geologic region.

In this disclosure, the term "fluid" may include liquids, gases, or both. In this disclosure, the term "spacer fluid" refers to a fluid utilized to space apart any two other materials utilized in well production.

In this disclosure, the term "set," "setting," or "thickening," when used in the context of the LCM compositions, may refer to the process of a liquid, slurry, or fluid composition becoming a solid, semi-solid, or gelled composition. "Thickening" time is measured in Bearden units (Bc). "Fully set" LCM is considered to have a consistency of 100 Bc. However, 70 Bc is the maximum pumpable consistency. Usually, low consistency period can last few hours depending on the required conditions and LCM slurry compositions until it begins to set by reaching 100 Bc. "Setting time" or "thickening time" may refer to lengths of time between a first time at which the composition components are combined or placed in a wellbore and a second time at which the composition has a given consistency or pumpability given in Bc.

In this disclosure, the term "cure" or "curing," when used in the context of the resin(s)s, may refer to the process of cross-linking the resin.

In this disclosure, the term "cure time," when used in the context of the resin(s), may refer to a time duration between a first time at which a curing agent is added to the resins and a second time at which the resin(s) has cured to form at least a cross-linked resin.

The LCM compositions according to one or more embodiments may provide more stable formulations to remediate loss circulation problems in high pressure formations or at high depths compared to conventional cements. The LCM compositions may form a barrier to prevent drilling fluids at a pressure greater than the formation pressure from flowing out of the wellbore and into the formation. The LCM compositions may exhibit greater stability and reduced density compared to conventional cement compositions. As a result, the LCM composition may reduce or prevent penetration of drilling fluids into the high pressure formations or in high-injectivity zones.

In one or more embodiments, the LCM compositions may include a resin or a mixture of resins. The resin(s) may include bisphenol-A-based resins, bisphenol-F-based resins, aliphatic resins, aromatic resins, Novalac resins, or combinations of these resins. Aliphatic and aromatic resins may include glycidyl ethers and diglycidyl ethers. Glycidyl ethers may include alkyl glycidyl ethers, aromatic glycidyl ethers, or both. Glycidyl ethers may have chemical formula (I):

$$R^1—O—CH_2—(C_2H_3O) \quad (I)$$

where $R^1$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^1$ may be a branched, linear, or cyclic alkyl. In some embodiments, $R^1$ may include one or more substituted or unsubstituted aromatic rings. In some embodiments, the resin may include C12-C14 alkyl glycidyl ethers, butyl glycidyl ether, 2,3-epoxypropyl-o-tolyl ether, or combinations of these. Diglycidyl ethers may have chemical formula (II):

$$(OC_2H_3)—CH_2—O—R^2—O—CH_2—(C_2H_3O) \quad (II)$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In some embodiments, $R^2$ may include one or more substituted or unsubstituted aromatic rings. In some embodiments, $R^2$ may be an alkyl group or cycloalkyl group. For example, in some embodiments, the resin may include 1,6-hexanediol diglycidyl ether, which has chemical formula (III):

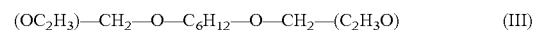

$$(OC_2H_3)—CH_2—O—C_6H_{12}—O—CH_2—(C_2H_3O) \quad (III)$$

In some embodiments, the resin(s) may include cyclohexanedimethanol diglycidyl ether, which has chemical formula (IV):

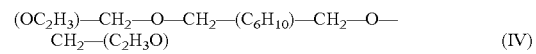

$$(OC_2H_3)—CH_2—O—CH_2—(C_6H_{10})—CH_2—O—CH_2—(C_2H_3O) \quad (IV)$$

In one or more embodiments, the resin(s) in the LCM compositions may include at least one of a bisphenol-A-epichlorohydrin resin, an alkyl glycidyl ether, an alkyl diglycidyl ether, an aromatic glycidyl ether, or combinations of these. In some embodiments, the resin in the LCM composition may include at least one of 1,6-hexanediol diglycidyl ether, alkyl glycidyl ethers having from 12 to 14 carbon atoms, butyl glycidyl ether, 2,3-epoxypropyl o-tolyl ether, cyclohexanedimethanol diglycidyl ether, bisphenol-A-epichlorohydrin resin, or combinations of these. In some embodiments, the resin(s) of the LCM compositions may include at least one of 1,6-hexanediol diglycidyl ether, alkyl glycidyl ethers having from 12 to 14 carbon atoms, 2,3-epoxypropyl o-tolyl ether, butyl glycidyl ether, cyclohexanedimethanol diglycidyl ether, or combinations of these.

The resin(s) may have an epoxy value of from 4.5 epoxy equivalents per kilogram of the resin to 5.5 epoxy equivalents per kilogram of the resin. The epoxy equivalent weight of an resin is the weight of the resin in grams that contains one equivalent weight of epoxy. The epoxy equivalent weight of the resin is equal to the molecular weight of the resin divided by the average number of epoxy groups in the resin. The resin(s) may have an epoxy equivalent weight of from 170 to 350 grams of resin per epoxy equivalent (g/eq). The epoxy value and epoxy equivalent weight of an resin may be determined according to ASTM-D1652. Other methods of determining the epoxy value and epoxy equivalent weight of the resin may also be used to determine the epoxy value or epoxy equivalent weight of the resin.

In some embodiments, the resin(s) may be modified with a reactive diluent. The type and amount of reactive diluent may influence the viscosity, flexibility, hardness, chemical resistance, mechanical properties, plasticizing effect, reactivity, crosslinking density, or other properties of the resin. In some embodiments, the reactive diluent may be added to the resin to change the viscosity of the resin(s), such as to reduce the viscosity of the resin. In other embodiments, the reactive diluents may be added to improve at least one of the adhesion, the flexibility, and the solvent resistance of the resin(s). The reactive diluent can be a non-functional, monofunctional, di-functional, or multi-functional reactive diluent. For example, a non-functional reactive diluent does not have an epoxide functional group. As used in relation to reactive diluents, the term "functional" refers to the reactive diluent having at least one epoxide functional group. A functional reactive diluent may have one, two, three, or more than three epoxide functional groups. The term "non-functional," as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the resin(s). Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the resin may include a reactive diluent having the formula (V):

$$R^3—O—CH_2—(C_2H_3O) \hspace{2cm} (V)$$

where $R^3$ may be a linear or branched hydrocarbyl having from 12 to 14 carbon atoms. $R^3$ may be linear, branched, or cyclic. In some embodiments, $R^3$ may be an alkyl group.

The resin(s) in the LCM compositions may include an amount of reactive diluent that modifies one or more of the viscosity, adhesion, the flexibility, or the solvent resistance of the resin. In some embodiments, the resin(s) may include a reactive diluent. As used in this disclosure, the term "resin portion" refers to the resin(s) and does not include cross-linkers, accelerators, retarders, or additives. The resin portion may include the resin(s) and any added reactive or non-reactive diluent.

In some embodiments, the resin(s) may include bisphenol-A-(epichlorohydrin) resin with oxirane mono [($C_{12}$-$C_{14}$)-alkyloxy)methyl] derivatives. The bisphenol-A-epichlorohydrin resin is an resin made by reaction of bisphenol-A and epichlorohydrin. The bisphenol-A-(epichlorohydrin) resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final cured epoxy. The bisphenol-A-(epichlorohydrin) resin with the reactive diluent oxirane mono [($C_{12}$-$C_{14}$)-alkyloxy) methyl] derivatives may modify the viscosity of the LCM compositions, or may provide the LCM compositions with a non-crystalizing resin and improved mechanical and chemical resistance compared to compositions without the bisphenol-A-(epichlorohydrin) resin with the reactive diluent oxirane mono [($C_{12}$-$C_{14}$)-alkyloxy) methyl] derivatives. In some embodiments, the resin portion may include from about 70 wt % to about 90 wt %, from about 75 wt % to about 85 wt %, from about 76 wt % to about 84 wt %, from about 77 wt % to about 84 wt %, from about 78 wt % to about 83 wt %, or from about 78 wt % to about 82 wt %, of the bisphenol-A-epichlorohydrin resin based on the total weight of the resin portion of the resin(s). In some embodiments, the resin(s) may include from about 10 wt % to about 30 wt %, from about 15 wt % to about 25 wt %, from about 16 wt % to about 24 wt %, from about 17 wt % to about 23 wt %, from about 18 wt % to about 22 wt %, or from about 18 wt % to about 21 wt % oxirane mono[($C_{12}$-$C_{14}$)-alkyloxy)methyl] derivatives based on the total weight of the resin portion of the resin(s).

In one or more embodiments, the resin(s) may include bisphenol-A-(epichlorohydrin) resin with the reactive diluent oxirane mono [($C_{12}$-$C_{14}$)-alkyloxy) methyl] derivatives may have an epoxy value of from 4.76 epoxy equivalents per kilogram of resin to 5.26 epoxy equivalents per kilogram of resin. The resin(s) comprising the bisphenol-A-(epichlorohydrin) resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa*s) to 1200 mPa*s, or 600 mPa*s to 900 mPa*s.

The resin(s) of the LCM compositions may include 2,3-epoxypropyl-o-tolyl ether, which may have an epoxy equivalent weight of from 170 g/eq to 190 g/eq and exhibit a dynamic viscosity of from 7 mPa*s to 10 mPa*s. In other embodiments, the resin(s) may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. In some embodiments, the resin(s) may include 1,6-hexanediol diglycidyl ether, which may have an epoxy equivalent weight of from 150 g/eq to 170 g/eq and may exhibit a dynamic viscosity of from 20 mPa*s to 30 mPa*s. In one or more embodiments, the resin(s) may include cyclohexanedimethanol diglycidyl ether, which may have an epoxy equivalent weight of from 125 g/eq to 145 g/eq and may exhibit a dynamic viscosity of from 50 mPa*s to 70 mPa*s. In some embodiments, the resin(s) may include butyl glycidyl ether, which may have an epoxy equivalent weight of from 120 g/eq to 140 g/eq and may exhibit a dynamic viscosity of from 400 mPa*s to 500 mPa*s.

In one or more embodiments, the resin(s) of the LCM compositions may include a combination of two or more of bisphenol-A-based resins, bisphenol-F-based resins, aliphatic resins, aromatic resins, Novalac resins, or combinations of these resins. In some embodiments, the resin(s) in the LCM compositions may include two or more of 1,6-hexanediol diglycidyl ether, alkyl glycidyl ethers having from 12 to 14 carbon atoms, butyl glycidyl ether, 2,3-epoxypropyl o-tolyl ether, cyclohexanedimethanol diglycidyl ether, bisphenol-A-epichlorohydrin resin, or combinations of these. In some embodiments, the resin(s) in the LCM compositions may include bisphenol-A-epichlorohydrin resin and butyl glycidyl ether. In some embodiments, the resin in the LCM compositions may include bisphenol-A-epichlorohydrin resin, butyl glycidyl ether, and cyclohexanedimethanol diglycidyl ether.

Where used, the resin(s) may be present in the LCM compositions in an amount in the range of from about 1% to about 15% bwoc (by weight of cement). In some embodiments, the emulsifier(s) may be present in the LCM compositions in an amount in the range of from about 2% to about 10% bwoc.

In one or more embodiments, the LCM compositions may include one or more crosslinkers or curing agents to cross-link the resin(s). The crosslinkers may include at least one amine group. For example, crosslinkers with amine functional groups may include, but are not limited to, at least one of an amine, polyamine, amine adduct, polyamine adduct, alkanolamine, phenalkamines, or combinations of these. Amine or polyamine crosslinkers may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In one or more embodiments, the crosslinkers may include at least one of diethylenetriamine (DETA), diethyltoluenediamine (DETDA), polyoxypropylene diamine, trimethyl hexamethylene diamine (TMD), triethylenetramine (TETA), meta-xylenediamine (MXDA), aminoethylpiperazine (AEP), tetraethylenepentamine (TEPA), polyetheramine, isophoronediamine (IPDA), or combinations of these. In some embodiments, the crosslinkers may include at least one of DETA, DETDA, polyoxypropylene diamine, or combinations of these. The resin(s) in the LCM compositions may include a plurality of crosslinkers.

The crosslinkers may be an amine crosslinker having an amine value that enables the amine crosslinker to fully crosslink the resin(s). The amine value of a crosslinker gives the active hydrogen (NH) content of an amine crosslinker. The amine value is expressed as the weight in milligrams of potassium hydroxide (KOH) needed to neutralize the NH in 1 gram of the amine curing agent. In some embodiments, the crosslinker may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the crosslinker with a dilute acid, such as a 1 N solution of hydrogen chloride (HCl). The amine value may then be calculated from the amount of HCl needed to neutralize the amine in the solution according to Equation 1 (Eq. 1):

$$\frac{V_{HCl} * N_{HCl} * MW_{KOH}}{W} \qquad \text{Eq. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (Eq. 2):

$$\frac{1000 * MW_{KOH}}{MW_{curing\ agent}} \qquad \text{Eq. 2}$$

where $MW_{KOH}$ is the molecular weight of KOH in grams per mole, and $MW_{curing\ agent}$ is the molecular weight of the curing agent in grams per mole.

The amine crosslinker may have an amine hydrogen equivalent weight (AHEW) that enables the amine crosslinker to fully cure the resin(s). The AHEW of an amine crosslinker refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the crosslinker may be an amine crosslinker having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods according to one or more embodiments.

In one or more embodiments, the LCM compositions may include an amount of crosslinker(s) sufficient to crosslink the crosslinker(s) of the LCM composition to a semi-solid or solid state. Where used, the crosslinker(s) may be present in the LCM compositions in an amount in the range of from about 0.01% to about 5% bwoc. In some embodiments, the emulsifier(s) may be present in the LCM compositions in an amount in the range of from about 0.05% to about 1% bwoc.

In one or more embodiments, the LCM compositions may include one or more emulsifiers. In some embodiments, the emulsifiers may include an ethoxylated phenol.

In one or more embodiments, the LCM compositions may include a polyaminated fatty acid. For example, the polyaminated fatty acid may have the chemical formula (VI):

CH$_2$—NH—CO—R$^5$ (VI)

where R$^4$ is a hydrocarbyl group and R$^5$ is a hydrocarbyl group or an alkylene carboxylate group having formula —R$^6$—COOH, where R$^6$ is a saturated or unsaturated hydrocarbylene. R$^4$ may be a saturated or unsaturated hydrocarbyl group, such as a saturated alkyl (—C$_y$H$_{2y+1}$ where y is the number of carbon atoms in R$^4$), an unsaturated alkyl (—C$_y$H$_{(2y-2z-4w+1)}$ where y is the number of carbon atoms in R$^4$, z is zero or a number of double bonds in R$^4$, and w is zero or a number of triple bonds in R$^4$), an alkenyl (—CH═CHC$_y$H$_{(2y-2z-4w+1)}$ where y is zero or an integer greater than zero, z is zero or a number of additional double bonds in R$^8$, and w is zero or the number of triple bonds in R$^4$), or an alkynyl (—C≡CC$_y$H$_{(2y-2z-4w+1)}$ where y is zero or an integer greater than zero, z is zero or the number of double bonds in R$^4$, and w is zero or a number of additional triple bonds in R$^4$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —(CH$_2$)$_y$CH$_3$ and linear alkenyls of formula —CH═(CH$_2$)$_y$CH$_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, R$^4$ may include a cyclic hydrocarbyl group, such as but not limited to a phenyl group, cyclohexyl group, or cycloheptyl group. In embodiments, R$^4$ may be a linear or branched hydrocarbyl group. R$^4$ may have from 1 to 20 carbon atoms (carbons), such as from 1 to 18 carbons, from 1 to 16 carbons, from 1 to 14 carbons, from 1 to 12 carbons, from 1 to 10 carbons, from 6 to 20 carbons, from 6 to 18 carbons, from 6 to 16 carbons, from 6 to 14 carbons, from 6 to 12 carbons, from 6 to 10 carbons, from 8 to 20 carbons, from 8 to 18 carbons, from 8 to 16 carbons, from 8 to 14 carbons, from 8 to 12 carbons, from 8 to 10 carbons, from 10 to 20 carbons, from 20 to 18 carbons, from 10 to 16 carbons, from 10 to 14 carbons, from 10 to 12 carbons, from 12 to 20 carbons, from 12 to 18 carbons, from 12 to 16 carbons, from 12 to 14 carbons, from 14 to 20 carbons, from 14 to 18 carbons, from 14 to 16 carbons, from 16 to 20 carbons, or 13 carbons. In some embodiments, R$^8$ may be a saturated linear hydrocarbyl group. Alternatively, in other embodiments, R$^8$ may be a branched hydrocarbyl group.

In one or more embodiments, R$^5$ can be a hydrocarbyl group or an alkylene carboxylate group having formula —R$^6$—COOH, where R$^6$ is a saturated or unsaturated hydrocarbylene group. In some embodiments, R$^5$ may be a saturated or unsaturated hydrocarbyl group, such as a saturated alkyl (—C$_y$H$_{2y+1}$ where y is the number of carbon atoms in R$^5$), an unsaturated alkyl (—C$_y$H$_{(2y-2z-4w+1)}$ where y is the number of carbon atoms in R$^5$, z is zero or a number of double bonds in R$^9$, and w is zero or a number of triple bonds in R$^5$), an alkenyl (—CH═CHC$_y$H$_{(2y-2z-4w+1)}$ where y is zero or an integer greater than zero, z is zero or a number of additional double bonds in $R^9$, and w is zero or the number of triple bonds in $R^5$), or an alkynyl (—C≡CC$_y$H$_{(2y-2z-4w+1)}$ where y is zero or an integer greater than zero, z is zero or the number of double bonds in $R^5$, and w is zero or a number of additional triple bonds in $R^5$). Each of the general formulas for saturated alkyl, unsaturated alkyl, saturated alkenyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —(CH$_2$)$_y$CH$_3$ and linear alkenyls of formula —CH═(CH$_2$)$_y$CH$_3$ where y is an integer from 0 to 15. Specific examples of linear alkyls include methyl, ethyl, n-propyl, n-butyl, n-hexyl, n-heptyl, n-octyl, n-nonyl, and n-decyl. Specific examples of linear alkenyls include vinyl and allyl. In further examples, $R^5$ may include a cyclic hydrocarbyl group, such as but not limited to a phenyl group, cyclohexyl group, or cycloheptyl group. $R^5$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^5$ may be methyl (—CH$_3$), phenyl (—(C$_6$H$_5$)), or ethyl (—CH$_2$CH$_3$).

Alternatively, in other embodiments, $R^9$ may be an alkylene carboxylate group having formula —$R^6$—COOH, where $R^6$ is a saturated or unsaturated hydrocarbylene group, such as an alkylene, alkenylene, or a cyclic hydrocarbylene. Cyclic hydrocarbylenes may include aromatic or non-aromatic cyclic hydrocarbylenes, such as but are not limited to, phenyl groups, cyclohexyl groups, or combinations of these. $R^6$ may have from 1 to 10 carbons, such as from 1 to 8 carbons, from 1 to 6 carbons, from 1 to 4 carbons, from 2 to 10 carbons, from 2 to 8 carbons, from 2 to 6 carbons, from 2 to 4 carbons, from 4 to 10 carbons, or from 4 to 8 carbons. In some embodiments, $R^6$ may be —CH$_2$CH$_2$— or —CH═CH—.

In embodiments, $R^5$ may be selected from the group consisting of methyl, phenyl, —CH$_2$CH$_2$—COOH, and —CH═CH—COOH. For example, in some embodiments, $R^5$ may have the formula —CH═CH—COOH, such that the polyaminated fatty acid compound has formula (VII):

$$R^4\text{—CO—NH—CH}_2\text{—CH}_2\text{—N(COR}^4\text{)—CH}_2\text{—CH}_2\text{—NH—CO—CH═CH—COOH} \quad (VII)$$

where $R^4$ is hydrocarbyl group having from 1 to 20 carbon atoms. In another example, $R^5$ may have the formula —CH$_3$ such that the polyaminated fatty acid compound has the formula (VIII):

$$R^4\text{—CO—NH—CH}_2\text{—CH}_2\text{—N(COR}^4\text{)—CH}_2\text{—CH}_2\text{—NH—CO—CH}_3 \quad (VIII)$$

where $R^4$ is hydrocarbyl group having from 1 to 20 carbon atoms. In still another example, $R^5$ may be phenyl (—(C$_6$H$_5$)) such that the polyaminated fatty acid compound has the formula (IX):

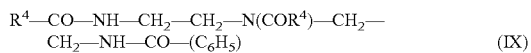

$$R^4\text{—CO—NH—CH}_2\text{—CH}_2\text{—N(COR}^4\text{)—CH}_2\text{—CH}_2\text{—NH—CO—(C}_6\text{H}_5\text{)} \quad (IX)$$

where $R^4$ is hydrocarbyl group having from 1 to 20 carbon atoms. In another example, $R^5$ may have the formula —CH$_3$ such that the polyaminated fatty acid compound has the formula (X):

$$R^4\text{—CO—NH—CH}_2\text{—CH}_2\text{—N(COR}^4\text{)—CH}_2\text{—CH}_2\text{—NH—CO—CH}_2\text{—CH}_2\text{—COOH} \quad (X)$$

where $R^4$ is hydrocarbyl group having from 1 to 20 carbon atoms.

The polyaminated fatty acid may be synthesized by a two-step process. In the first step, a fatty acid is reacted with diethylene triamine (DETA) to produce an amide and water. The fatty acid has the general chemical formula $R^4$—COOH, where $R^4$ is the hydrocarbyl group previously described with respect to formula (IX).

The fatty acid having formula $R^4$—COOH may be a naturally-derived or a synthetically-derived fatty acid. The fatty acid may be a naturally-occurring fatty acid, such as a fatty acid derived from natural sources, example of which may include animal fats or vegetable oils. The fatty acid may be produced through hydrolysis of triglycerides, phospholipids, or both triglycerides and phospholipids and removal of glycerol. The triglycerides and phospholipids may be derived from natural sources such as animal fats or vegetable fats. Triglycerides and phospholipids from plant-based sources may include but are not limited to coconut oil, palm oil, soybean oil, tall oil, tall oil fatty acids (TOFA), or combinations of these sources. In some examples, the fatty acid may be a saturated fatty acid resulting from hydrogenation of a naturally-derived unsaturated fatty acid. Alternatively, the fatty acid may be a synthetic fatty acid prepared from a petroleum source or other source through one or more synthesis reactions. In examples, the fatty acid may be a synthetic fatty acid derived through hydrocarboxylation of alkenes. Non-limiting examples of fatty acids may include, but are not limited to, caprylic acid, capric acid, lauric acid, myristic acid, palmitic acid, stearic acid, arachidic acid, myristoleic acid, palmitoleic acid, sapienic acid, oleic acid, elaidic acid, vaccenic acid, linoleic acid, linoelaidic acid, α-linoleic acid, arachidonic acid, eicosapentaenoic acid, or combinations of any of these fatty acids. Other naturally-occurring or synthetic fatty acids are also contemplated. In some embodiments, the fatty acid may be tall oil fatty acid. Tall oil fatty acid may include at least one of palmitic acid, oleic acid, linoleic acid, or combinations of these. In embodiments, the fatty acid may be a tall oil fatty acid derived from distillation of crude tall oil. In one or more embodiments, the fatty acid may include a hydrocarbyl group ($R^4$) having from 12 to 14 carbon atoms. In one or more embodiments, the polyaminated fatty acid compounds may be made using a saturated linear fatty acid having a saturated linear hydrocarbyl group $R^4$ with 12 carbon atoms. In some embodiments, the emulsifier may be a sodium salt of modified tall oil fatty amide. In some embodiments, the emulsifier may be an oxidized tall oil fatty amidoamine. In some embodiments, the emulsifier may be an ether carboxylic acid.

Where used, the emulsifier(s) may be present in the LCM compositions in an amount in the range of from about 0.01% to about 5% bwoc. In some embodiments, the emulsifier(s) may be present in the LCM compositions in an amount in the range of from about 0.05% to about 1% bwoc.

In one or more embodiments, the LCM compositions may include one or more cementitious and/or weighting agents. The cementitious and/or weighting agents may include, but are not limited to, class G cement and/or silica sand. The cementitious and/or weighting agents may further include barite (barium sulfate) and/or manganese tetraoxide.

In one or more embodiments, the LCM compositions may include one or more retarder(s) or retarding agent(s). The retarder(s) may include, but are not limited to, ligno-sulfonates, organic acids, phosphonic acid derivatives, synthetic polymers (e.g. copolymers of 2-acrylamido-2-methylpropane sulfonic acid ("AMPS") and unsaturated carboxylic acids), inorganic borate salts, and combinations thereof. The retarder(s) may include retardant commercially available as "LTR™", available from Sanjel, Canada. Where used, the retardant(s) may be present in the LCM compositions in an amount in the range of from about 0.01% to about 0.5% bwoc. In some embodiments, the dispersant may be present in the LCM compositions in an amount in the range of from about 0.05% to about 0.1% bwoc.

In one or more embodiments, the LCM compositions may include one or more dispersant(s). The dispersant(s) may control the rheology of the LCM compositions. The dispersant(s) may include, but are not limited to, water-soluble polymers prepared by the caustic-catalyzed condensation of formaldehyde with acetone wherein the polymer contains sodium sulfate groups, these dispersants are commercially available as "CFR-3™" available from Sanjel, Canada, or dispersant commercially available as "CFR-2™" dispersants, also available from Sanjel, Canada. Where used, the dispersants may be present in the LCM compositions in an amount in the range of from about 0.1% to about 5.0% bwoc or from about 0.1% to about 4.0% bwoc or from about 0.1% to about 2.0% bwoc. In some embodiments, the dispersant may be present in the LCM compositions in an amount in the range of from about 0.1% to about 1.0% bwoc.

In one or more embodiments, the LCM compositions may include one or more silicon-based defoamer(s). The silicon-based defoamer(s) may include, but are not limited to, commercially available defoamer under the trade name "DF-3™" antifoaming agent available from Sanjel, Canada. Where used, the silicon-based defoamer(s) may be present in the LCM compositions in an amount in the range of from about 0.001% to about 0.5% bwoc. In some embodiments, the dispersant may be present in the LCM compositions in an amount in the range of from about 0.01% to about 0.1% bwoc.

The LCM compositions may include from about 1% to about 15% bwoc resin, from about 0.01% to about 5% bwoc crosslinker, from about 0.01% to about 5% bwoc emulsifier, from about 0.1% to about 2.0% bwoc dispersant, from about 0.01% to about 0.5% bwoc retardant, and from about 0.001% to about 0.5% bwoc silicon-based defoamer. The LCM compositions may include from about 1% to about 10% bwoc resin, from about 0.05% to about 1% bwoc crosslinker, from about 0.05% to about 1% bwoc emulsifier, from about 0.5% to about 1.5% bwoc dispersant, from about 0.05% to about 0.4% bwoc retardant, and from about 0.005% to about 1% bwoc silicon-based defoamer.

In some embodiments, the LCM compositions may include other additives and modifiers, such as but not limited to viscosifiers, fluid loss additives, and expansion additives, or combinations of these.

The thickening time of the LCM compositions may be inversely proportional to the amount of emulsifier(s) in the LCM compositions. For example, decreasing the amount of emulsifier(s) in the LCM compositions may increase the thickening time of the LCM compositions. The thickening time of the LCM compositions may be inversely proportional to the amount of crosslinker(s) in the LCM compositions. For example, decreasing the amount of crosslinker(s) in the LCM compositions may increase the thickening time of the LCM compositions. Increasing the amount of crosslinker concentration may reduce the time for the LCM compositions to thicken to semi-solid or solid materials sufficient to seal a lost circulation zone of a wellbore. Decreasing the amount of retarder(s) in the LCM compositions may decrease the thickening time while maintaining the rheological properties of the LCM compositions. Increasing the amount of resin(s) and adding silica sand in the LCM compositions may increase the rheology while maintaining the thickening time of an LCM composition without the increase in resin(s) and added silica sand.

In one or more embodiments, the LCM compositions are capable of sealing a lost circulation zone in a high-pressure formation. The LCM compositions are capable of sealing a lost circulation zone in high injectivity zones.

The LCM compositions may have a density of from about 115 pcf (equivalent to about 1842 kg/m$^3$) to about 150 pcf (equivalent to about 2403 kg/m$^3$), or from about 115 pcf to about 145 pcf (equivalent to about 2323 kg/m$^3$), or from about 115 pcf (equivalent to about 1041 kg/m$^3$) to about 140 pcf (equivalent to about 2243 kg/m$^3$), or from about 115 pcf to about 135 pcf (equivalent to about 2162 kg/m$^3$), or from about 115 pcf to about 130 pcf (equivalent to about 2082 kg/m$^3$), or from about 115 pcf to about 125 pcf (equivalent to about 2002 kg/m$^3$), or from about 115 pcf to about 120 pcf (equivalent to about 1922 kg/m$^3$), and may be capable of being injected through a drill bit of a drill string into the lost circulation zone. The LCM compositions may include resin(s), crosslinker(s), emulsifier(s), cementing and/or weighting agent(s), retarder(s), dispersant(s), silicon-based defoamer(s). The resin(s) may include one or more than one of the resins described in this disclosure. The crosslinker(s) may include one or a plurality of curing agents described in this disclosure. The cementitious and/or weighting agent(s) may include one or a plurality of cementing or weighting agents described in this disclosure. The emulsifier(s) may include one or a plurality of the emulsifiers described in this disclosure. The retarder(s) may include one or a plurality of retarding agents described in this disclosure. The dispersant(s) may include one or a plurality of dispersing agents described in this disclosure. The silicon-based defoamer(s) may include one or a plurality of defoamers described in this disclosure. The LCM compositions may include any other constituent, property, or characteristic previously described in this disclosure for the LCM composition.

The LCM compositions of the methods according to some embodiments may have thickening time of from about 3 hours than about 6 hours by reaching a Bearden consistency of 100 Bc, or from about 3 hours 10 minutes to about 5 hours 50 minutes by reaching a Bearden consistency of 100 Bc, or from about 3 hours 20 minutes to about 5 hours 40 minutes by reaching a Bearden consistency of 100 Bc. The LCM compositions of the methods according to some embodiments may have thickening time of from about 3 hours than about 5 hours by reaching a Bearden consistency of 70 Bc, or from about 3 hours 10 minutes to about 4 hours 50 minutes by reaching a Bearden consistency of 70 Bc, or from about 3 hours 20 minutes to about 4 hours 40 minutes by reaching a Bearden consistency of 70 Bc. The LCM compositions of the methods according to some embodiments may include any other constituent, property, or characteristic previously described in this disclosure for the LCM compositions.

Introducing the LCM compositions into the lost circulation zone may include injecting the LCM compositions through the drill bit of the drill string. In some embodiments, the drill string may not be removed from the wellbore prior to introducing the LCM compositions to the lost circulation zone. The LCM compositions of the present disclosure are injectable through the drill bit so that the drill string does not need to be removed from the wellbore to replace the drill bit with an open-ended pipe or other injection device before injecting the LCM compositions into the lost circulation zone. Although described in this disclosure as being able to be injected through the drill bit, the LCM compositions may also be injected through other methods or techniques, such as but not limited to squeezing, injection through tubing, injection through the casing, or injection through the annulus. In some embodiments, the lost circulation zones may be located in high pressure formations, such as formations where the lost circulation zone is located at a depth of up to 15,000 feet. In some embodiments, one or more subsequent treatments with the LCM compositions may be conducted to fully treat the lost circulation zone.

EXAMPLES

The following examples are merely illustrative and should not be interpreted as limiting the scope of the present disclosure.

Preparation of LCM Compositions

Four different LCM compositions were prepared. The resins, emulsifiers and crosslinkers of the compositions of Examples 1-4 are listed in Tables 1-3.

TABLE 1

| Resin ID | Name |
|---|---|
| Resin 1 | bisphenol-A-epichlorohydrin resin with the reactive diluent oxirane mono [(C12-C14)-alkyloxy)methyl] derivatives (RAZEEN ® 2254 obtained from Jubail Chemical Industries LLC of Jubail, Saudi Arabia) |
| Resin 2 | 2,3-epoxypropyl-o-tolyl ether |
| Resin 3 | C12-C14 alkyl glycidyl ether (RAZEEN ® 7106 obtained from Jubail Chemical Industries LLC of Jubail, Saudi Arabia) |
| Resin 4 | 1,6-hexanediol diglycidyl ether |
| Resin 5 | Bisphenol A/Epichlorohydrin resin and Butyl glycidyl ether (WellLock ™ R1 obtained from Halliburton Energy Services, Inc., Houston, Texas) |
| Resin 6 | Bisphenol A/Epichlorohydrin and Butyl glycidyl ether and Cyclohexanedimethanol |
| Resin 7 | Cyclohexanedimethanol diglydicyl ether (WellLock ™ R2 obtained from Halliburton Energy Services, Inc., Houston, Texas) |

TABLE 2

| Emulsifier ID | Name |
|---|---|
| Emulsifier 1 | Ethoxylated phenol |
| Emulsifier 2 | Sodium salt of modified tall oil fatty amide |
| Emulsifier 3 | Carboxylic acid terminated fatty polyamide |
| Emulsifier 4 | Modified amidoamine |
| Emulsifier 5 | Tall oil fatty acid |
| Emulsifier 6 | Oxidized tall oil fatty amidoamine |
| Emulsifier 7 | Ether carboxylic acid |

TABLE 3

| Crosslinker ID | Name |
|---|---|
| Crosslinker 1 | 90-100% Diethylenetriamine (RAZEENCURE ® 931 (90-100% DETA) obtained from Jubail Chemical Industrie s LLC of Jubail, Saudi Arabia) |
| Crosslinker 2 | Diethyltoluenediamine |
| Crosslinker 3 | Polyoxypropylene Diamine |

The components and corresponding amounts of the LCM compositions of Examples 1-4 are listed in Tables 4-7.

Example 1

TABLE 4

LCM Compositions for Example 1

| Constituent | | |
|---|---|---|
| Saudi class G cement | % BWOC (by weight of cement) | 100.00 |
| Defoamer[1] | gps | 0.050 |
| Dispersant[2] | % BWOC | 0.60 |
| Retardant[3] | % BWOC | 0.25 |
| Emulsifier[4] | % BWOC | 0.89 |
| Resin[5] | % BWOC | 6.97 |
| Crosslinker[6] | % BWOC | 0.14 |

[1]DF-3 ™ (obtained from Sanjel, Canada)
[2]CFR-2 ™ (obtained from Sanjel, Canada)
[3]LTR ™ (obtained from Sanjel, Canada)
[4]LESUPERMUL ™ (Tall oil fatty acid reaction product with diethylenetriamine, maleic anhydride, tetraethylenepentamine, and triethylenetetramine (60-100%) obtained from Halliburton, USA)
[5]RAZEEN ® LR 2254 (obtained from Jubail Chemical Ind. Co., Saudi Arabia)
[6]RAZEENCURE ® 931 (obtained from Jubail Chemical Ind. Co., Saudi Arabia)

Some experimental details and conditions for the reaction mixture to obtain the LCM composition of Example 1 are provided in Table 5.

TABLE 5

| Density | Pcf | 118.00 |
|---|---|---|
| BHST | deg F | 192.00 |
| BHST | deg F | 131.00 |
| Yield | lb/ft3 | 1.180 |
| Water | gal/sk | 4.356 |
| Mix fluid | gal/sk | 5.286 |

Example 2

TABLE 6

LCM Compositions for Example 2

| Constituent | | |
|---|---|---|
| Saudi class G cement | % BWOC | 100.00 |
| Defoamer[7] | Gps | 0.050 |
| Dispersant[8] | % BWOC | 0.60 |
| Retardant[9] | % BWOC | 0.25 |
| Emulsifier[10] | % BWOC | 0.44 |

TABLE 6-continued

LCM Compositions for Example 2

| Constituent | | |
|---|---|---|
| Resin[11] | % BWOC | 6.97 |
| Crosslinker[12] | % BWOC | 0.14 |

[7]DF-3 ™ (obtained from Sanjel, Canada)
[8]CFR-2 ™ (obtained from Sanjel, Canada)
[9]LTR ™ (obtained from Sanjel, Canada)
[10]LESUPERMUL ™ (Tall oil fatty acid reaction product with diethylenetriamine, maleic anhydride, tetraethylenepentamine, and triethylenetetramine (60-100%) obtained from Halliburton, USA)
[11]RAZEEN ® LR 2254 (obtained from Jubail Chemical Ind. Co., Saudi Arabia)
[12]RAZEENCURE ® 931 (obtained from Jubail Chemical Ind. Co., Saudi Arabia)

Some experimental details and conditions for the reaction mixture to obtain the LCM composition of Example 2 are provided in Table 7.

TABLE 7

| Density | pcf | 118.00 |
|---|---|---|
| BHST | deg F | 192.00 |
| BHST | deg F | 131.00 |
| Yield | lb/ft3 | 1.180 |
| Water | gal/sk | 4.411 |
| Mix fluid | gal/sk | 5.289 |

Example 3

TABLE 8

LCM Compositions for Example 3

| Constituent | | |
|---|---|---|
| Saudi class G cement | % BWOC | 100.00 |
| Silica sand | % BWOC | 30 |
| Defoamer[13] | gps | 0.400 |
| Dispersant[14] | % BWOC | 0.40 |
| Retardant[15] | % BWOC | 0.2 |
| Emulsifier[16] | % BWOC | 0.44 |
| Resin[17] | % BWOC | 7.97 |
| Crosslinker[18] | % BWOC | 0.17 |

[13]DF-3 ™ (obtained from Sanjel, Canada)
[14]CFR-2 ™ (obtained from Sanjel, Canada)
[15]LTR ™ (obtained from Sanjel, Canada)
[16]LESUPERMUL ™ (Tall oil fatty acid reaction product with diethylenetriamine, maleic anhydride, tetraethylenepentamine, and triethylenetetramine (60-100%) obtained from Halliburton, USA)
[17]RAZEEN ® LR 2254 (obtained from Jubail Chemical Ind. Co., Saudi Arabia)
[18]RAZEENCURE ® 931 (obtained from Jubail Chemical Ind. Co., Saudi Arabia)

Some experimental details and conditions for the reaction mixture to obtain the LCM composition of Example 2 are provided in Table 9.

TABLE 9

| Density | pcf | 118.00 |
|---|---|---|
| BHST | deg F | 192.00 |
| BHST | deg F | 131.00 |
| Yield | lb/ft3 | 1.490 |
| Water | gal/sk | 5.400 |
| Mix fluid | gal/sk | 6.371 |

Example 4

TABLE 10

LCM Compositions for Example 4

| Constituent | | |
|---|---|---|
| Saudi class G cement | % BWOC | 100.00 |
| Silica sand | % BWOC | 30 |
| Defoamer[19] | gps | 0.400 |
| Dispersant[20] | % BWOC | 0.40 |
| Retardant[21] | % BWOC | 0.05 |
| Emulsifier[22] | % BWOC | 0.44 |
| Resin[23] | % BWOC | 7.97 |
| Crosslinker[24] | % BWOC | 0.17 |

[19]DF-3 ™ (obtained from Sanjel, Canada)
[20]CFR-2 ™ (obtained from Sanjel, Canada)
[21]LTR ™ (obtained from Sanjel, Canada)
[22]LESUPERMUL ™ (Tall oil fatty acid reaction product with diethylenetriamine, maleic anhydride, tetraethylenepentamine, and triethylenetetramine (60-100%) obtained from Halliburton, USA)
[23]RAZEEN ® LR 2254 (obtained from Jubail Chemical Ind. Co., Saudi Arabia)
[24]RAZEENCURE ® 931 (obtained from Jubail Chemical Ind. Co., Saudi Arabia)

Some experimental details and conditions for the reaction mixture to obtain the LCM composition of Example 2 are provided in Table 11.

TABLE 11

| Density | pcf | 118.00 |
|---|---|---|
| BHST | deg F | 192.00 |
| BHST | deg F | 131.00 |
| Yield | lb/ft3 | 1.490 |
| Water | gal/sk | 5.404 |
| Mix fluid | gal/sk | 6.364 |

Example 5—Thickening Time Test for the LCM Composition of Example 1

The thickening time test was conducted under conditions simulating downhole temperature and pressure conditions using a Chandler Engineering Consistometer Model 8340 according to API Spec 10 Code Schedule (1), API Recommended Practice 10B-2, and the Chandler Engineering Instruction Manual. The LCM composition of Example 1 was introduced as a slurry and the temperature and pressure of the LCM composition were gradually increased. The thickening time for the composition of Example 1 was determined to be approximately 18 minutes at 106° F. and approximately 500 psi. Thickening time is measured in Bearden units (Bc). Fully set cement is considered to have a consistency of 100 Bc. However, 70 Bc is the maximum pumpable consistency. Usually, low consistency period can last few hours depending on the required conditions and cement slurry compositions until it begins to set by reaching 100 Bc. Thickening times were measured when the composition of Example 1 reached Bearden consistencies of 30 Bc, 70 Bc (corresponding to the maximum value where the slurries can be pumpable) and 100 Bc (corresponding to point when the compositions are fully set), the results are shown in FIG. 1.

Example 6—Thickening Time Test for the LCM Composition of Example 2

Figure 2:
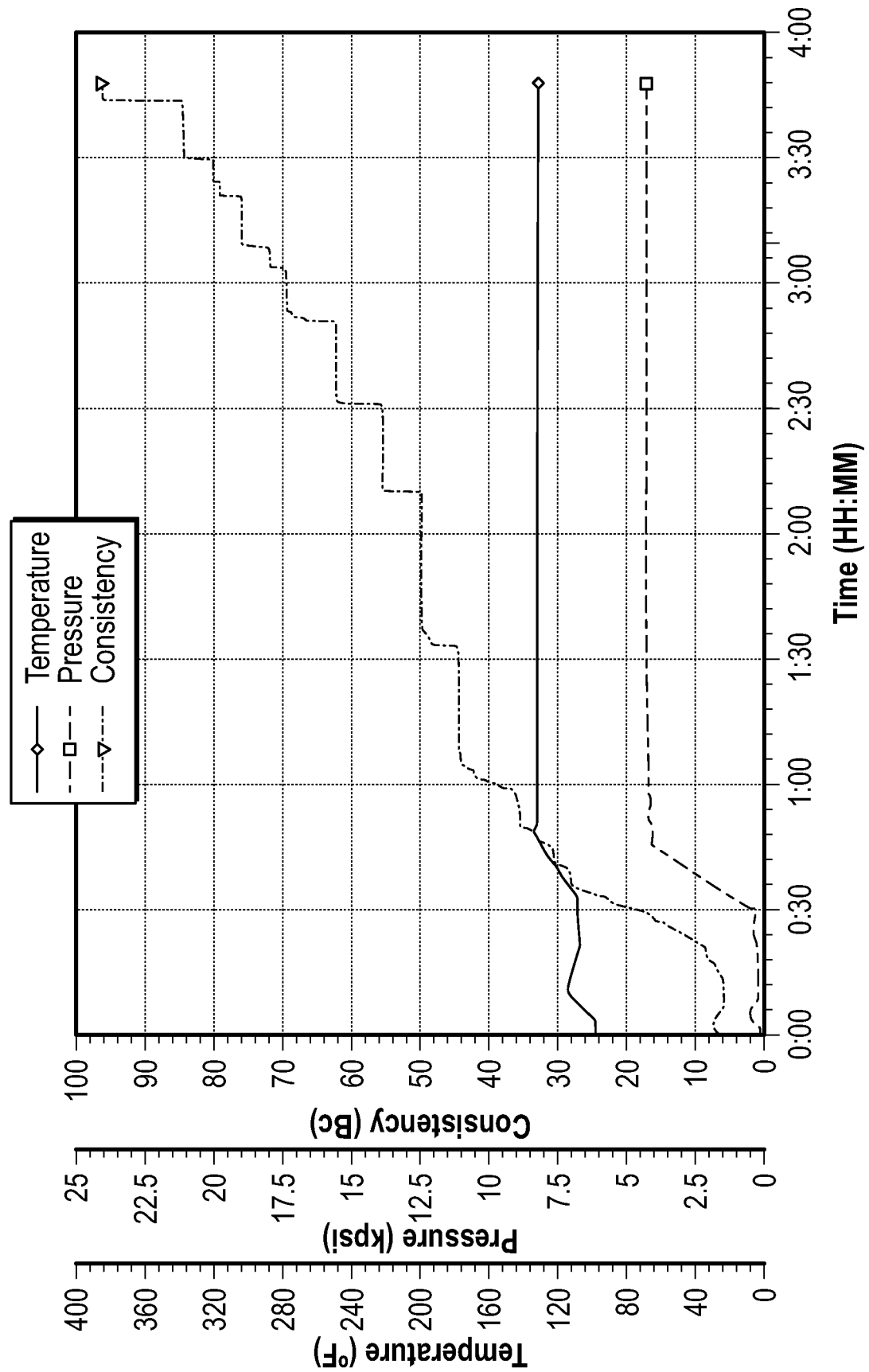
FIG. 2 illustrates the thickening times measured in the LCM composition of Example 2.

The thickening time test was conducted similarly to that of Example 5 but the temperature of the LCM composition of Example 2 was increased to a temperature of 130 degrees Fahrenheit (° F.) (54° C.) and the pressure was ramped up to a final pressure of 4000 pounds per square inch (psi) (27,579 kPa). The thickening times measured when the compositions reached Bearden consistencies of 30 Bc, 70 Bc, and 100 Bc are provided in Table 11 and FIG. 2.

TABLE 11

Thickening Times of the LCM Composition of Example 2

| Bearden Consistency | 30 Bc | 70 Bc | 100 Bc |
|---|---|---|---|
| Thickening Time (hours:minutes) | 0:40 | 3:03 | 3:47 |

As shown in Table 11, decreasing the emulsifier concentration increases the thickening time of the LCM composition when comparing Examples 1 and 2. In other words, increasing the emulsifier concentration may reduce the time for a LCM composition according to one or more embodiments to thicken to a semi-solid or solid material sufficient to seal a lost circulation zone of a wellbore.

Example 7—Thickening Time Test for the LCM Composition of Example 3

Figure 3:
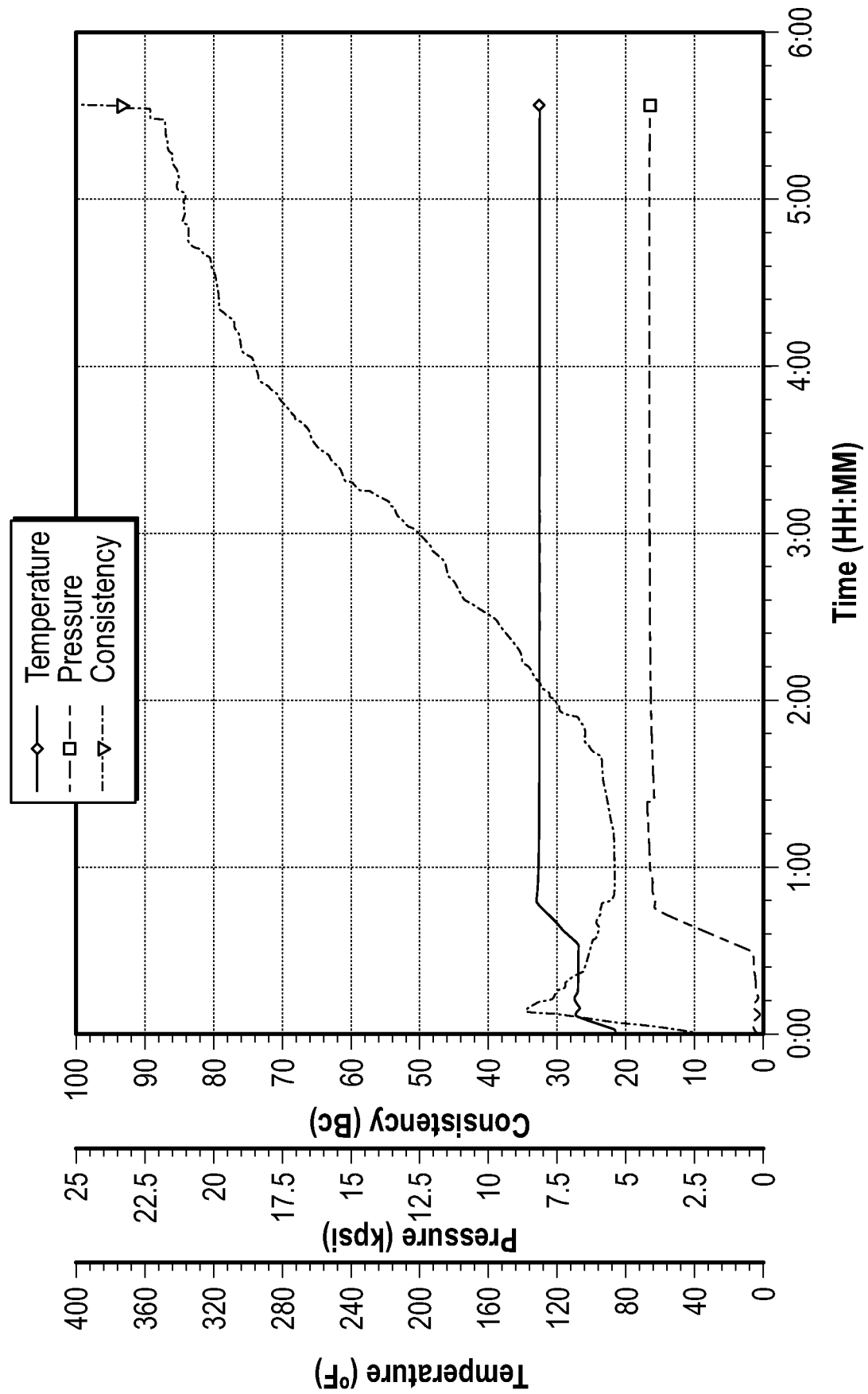
FIG. 3 illustrates the thickening times measured in the LCM composition of Example 3.

The thickening time test was conducted similarly to that of Example 6 where the temperature of the LCM composition of Example 3 was increased to a temperature of 130 degrees Fahrenheit (° F.) (54° C.) and the pressure was ramped up to a final pressure of 4000 pounds per square inch (psi) (27,579 kPa). The thickening times measured when the compositions reached Bearden consistencies of 30 Bc, 70 Bc, and 100 Bc are provided in Table 12 and FIG. 3.

TABLE 12

Thickening Times of the LCM Composition of Example 3

| Bearden Consistency | 30 Bc | 70 Bc | 100 Bc |
|---|---|---|---|
| Thickening Time (hours:minutes) | 1:55 | 3:47 | 5:33 |

Example 8—Thickening Time Test for the LCM Composition of Example 4

Figure 4:
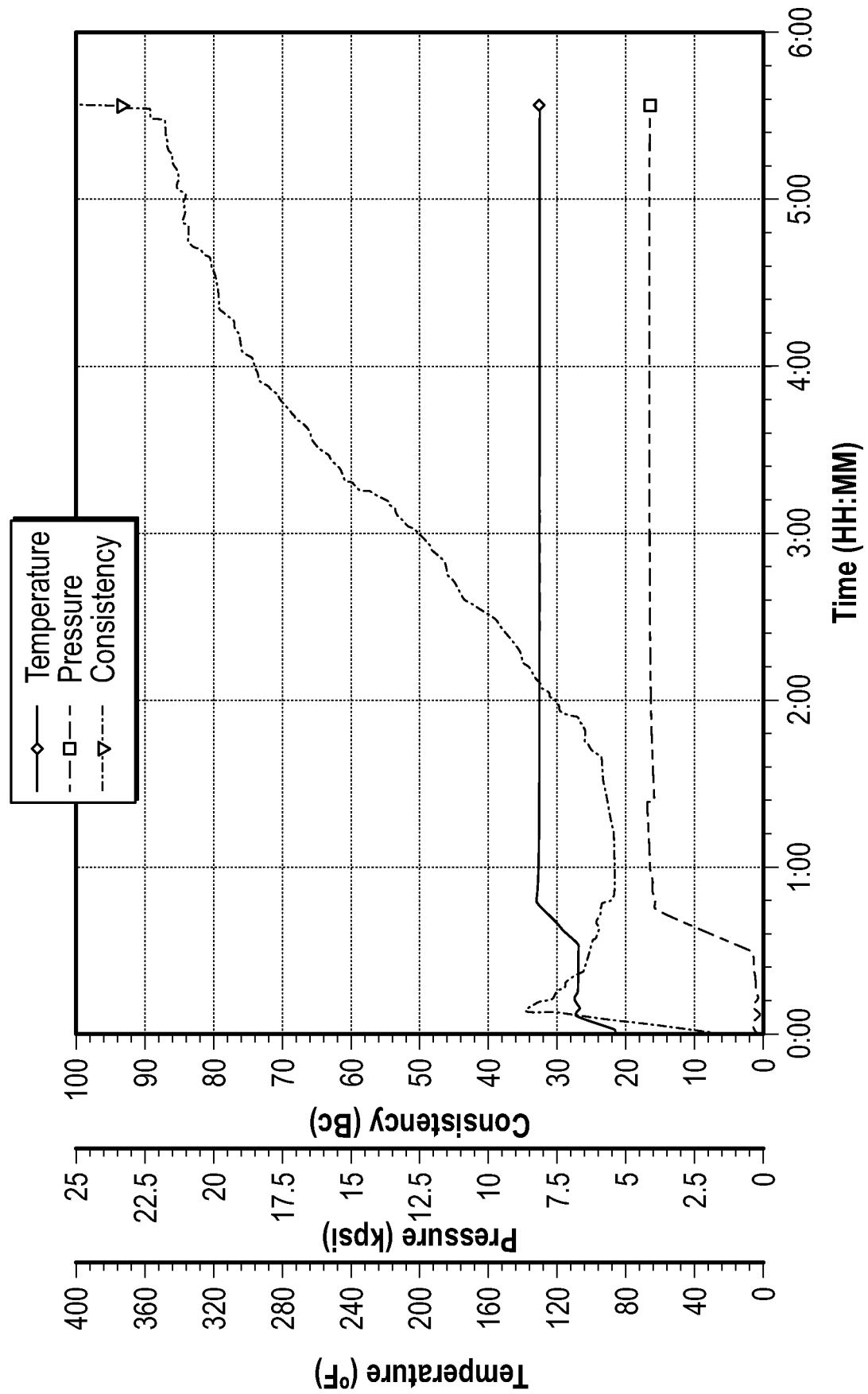
FIG. 4 illustrates the thickening times measured in the LCM composition of Example 4.

The thickening time test was conducted similarly to that of Example 6 where the temperature of the LCM composition of Example 3 was increased to a temperature of 130 degrees Fahrenheit (° F.) (54° C.) and the pressure was ramped up to a final pressure of 4000 pounds per square inch (psi) (27,579 kPa). The thickening times measured when the compositions reached Bearden consistencies of 30 Bc, 70 Bc, and 100 Bc are provided in Table 13 and FIG. 4.

TABLE 13

Thickening Times of the LCM Composition of Example 4

| Bearden Consistency | 30 Bc | 70 Bc | 100 Bc |
|---|---|---|---|
| Thickening Time (hours:minutes) | 1:30 | 4:53 | 5:05 |

As shown in Table 13, decreasing the concentration of crosslinker in the LCM compositions increases the thickening time of the LCM compositions. In other words, increasing the crosslinker concentration may reduce the time for a LCM composition according to one or more embodiments to thicken to a semi-solid or solid material sufficient to seal a lost circulation zone of a wellbore.

Example 9—Rheology for the LCM Composition of Example 1

The rheology data for the LCM composition of Example 1 is provided in Table 14.

TABLE 14

Rheology data for the LCM Composition of Example 1

| Reading (rpm) | Surface | 131° F. |
|---|---|---|
| 300 | 62 | 205 |
| 200 | 49 | 166 |
| 100 | 28 | 135 |
| 60 | 18 | 103 |
| 30 | 11 | 78 |
| 6 | 7 | 33 |
| 3 | 6 | 30 |
| PV | 51 | 105 |
| YP | 11 | 100 |
| 10 Sec Gel Strength | 9 | 23 |
| 10 Min Gel Strength | 45 | 68 |

Example 10—Rheology for the LCM Composition of Example 2

The rheology data for the LCM composition of Example 2 is provided in Table 15.

TABLE 15

Rheology data for the LCM Composition of Example 2

| Reading (rpm) | Surface | 131° F. |
|---|---|---|
| 300 | 65 | 73 |
| 200 | 51 | 56 |
| 100 | 28 | 36 |
| 60 | 20 | 28 |
| 30 | 12 | 22 |
| 6 | 8 | 18 |
| 3 | 7 | 17 |
| PV | 55.5 | 55.5 |
| YP | 9.5 | 17.5 |
| 10 Sec Gel Strength | 9 | 18 |
| 10 Min Gel Strength | 43 | 51 |

Example 11—Rheology for the LCM Composition of Example 3

The rheology data for the LCM composition of Example 3 is provided in Table 16.

TABLE 16

Rheology data for the LCM Composition of Example 3

| Reading (rpm) | Surface | 131° F. |
|---|---|---|
| 300 | 45 | 136 |
| 200 | 32 | 118 |
| 100 | 20 | 92 |
| 60 | 13 | 77 |
| 30 | 8 | 66 |
| 6 | 3 | 36 |
| 3 | 2 | 27 |
| PV | 37.5 | 66 |
| YP | 7.5 | 70 |

TABLE 16-continued

Rheology data for the LCM Composition of Example 3

| Reading (rpm) | Surface | 131° F. |
|---|---|---|
| 10 Sec Gel Strength | 5 | 43 |
| 10 Min Gel Strength | 98 | 51 |

As shown in Tables 12 and 17, increasing the resin concentration and adding silica sand in the composition of Example 3 (when compared to the compositions of Examples 1 and 2) increases the rheology while maintaining a desired thickening time of the LCM composition.

Example 12—Rheology for the LCM Composition of Example 4

The rheology data for the LCM composition of Example 4 is provided in Table 17.

TABLE 17

Rheology data for the LCM Composition of Example 4

| Reading (rpm) | Surface | 131° F. |
|---|---|---|
| 300 | 44 | 135 |
| 200 | 31 | 117 |
| 100 | 19 | 91 |
| 60 | 13 | 78 |
| 30 | 7 | 65 |
| 6 | 3 | 37 |
| 3 | 2 | 28 |
| PV | 37.5 | 66 |
| YP | 6.5 | 69 |
| 10 Sec Gel Strength | 4 | 42 |
| 10 Min Gel Strength | 101 | 60 |

As shown in Tables 13 and 16, decreasing the retarder concentration in the composition of Example 4 (when compared to the composition of Example 3) maintain the rheology while decreasing the thickening time for a full setting of the LCM composition.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optional" means that the subsequently described limitation may or may not be present. The description includes instances where the limitation is present and instances where it is not present.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A lost circulation material (LCM) composition comprising:
   from about 1% to about 15% bwoc of a resin having an epoxy value in a range from 4.5 epoxy equivalents per kilogram of resin to 5.5 epoxy equivalents per kilogram of resin and an epoxy equivalent weight in a range from 170 to 350 grams of resin per epoxy equivalent (g/eq);
   from about 0.01% to about 5 bwoc of an emulsifier selected from the group consisting of ethoxylated phenol, sodium salt of modified tall oil fatty amide, carboxylic acid terminated fatty polyamide, modified amidoamine, tall oil fatty acid, oxidized tall oil fatty amidoamine, ether carboxylic acid, and combinations thereof;
   from about 0.01% to about 5% bwoc of a crosslinker to crosslink the resin, where the crosslinker comprises at least one amine group;
   a cementitious and/or weighting agent;
   from about 0.01% to about 0.5% bwoc of a retarder, where the retarder is selected from the group consisting of lignosulfonates, organic acids, phosphonic acid derivatives, copolymers of 2-acrylamido-2-methylpropane sulfonic acid ("AMPS") and unsaturated carboxylic acids, inorganic borate salts, and combinations thereof;

from about 0.1% to about 2.0% bwoc of a dispersant; and from about 0.001% to about 0.5% bwoc of a silicon-based defoamer, wherein the LCM composition has a thickening time of from about 3 hours than about 6 hours by reaching a Bearden consistency of 100 Bc in a lost circulation zone of 4000 psi.

2. The LCM composition of claim 1, where the LCM composition has a thickening time of from about 3 hours than about 5 hours by reaching a Bearden consistency of 70 Bc.

3. The LCM composition of claim 1, where the resin comprises at least one of bisphenol-A-epichlorohydrin resin, $C_{12}$-$C_{14}$ alkyl glycidyl ether derivatives, 2,3-epoxypropyl o-tolyl ether, 1,6-hexanediol diglycidyl ether, butyl glycidyl ether, cyclohexanedimethanol diglycidyl ether, or combinations of these.

4. The LCM composition of claim 1, where the resin comprises bisphenol-A-epichlorohydrin resin and $C_{12}$-$C_{14}$ alkyl glycidyl ether.

5. The LCM composition of claim 1, where the crosslinker comprises at least one of diethylenetriamine (DETA), diethyltoluenediamine (DETDA), polyoxypropylene diamine, or combinations of these.

6. The LCM composition of claim 1, where the LCM composition comprises from about 0.10 weight percent to about 0.20 weight percent of crosslinker.

7. The LCM composition of claim 1, where the cementitious and/or weighting agent comprises class G cement and/or silica sand.

8. The LCM composition of claim 7, where the cementitious and/or weighting agent further comprises barite and/or manganese tetraoxide.

9. The LCM composition of claim 1, where the LCM composition has a density of from about 115 pounds per cubic foot (pcf) to about 150 pcf.

10. A method of eliminating or reducing lost circulation in a lost circulation zone from a well, the method comprising:
introducing a lost circulation material (LCM) composition into the well, the LCM composition comprising:
from about 1% to about 15% bwoc of a resin having an epoxy value in a range from 4.5 epoxy equivalents per kilogram of resin to 5.5 epoxy equivalents per kilogram of resin and an epoxy equivalent weight in a range from 170 to 350 grams of resin per epoxy equivalent (g/eq);

from about 0.01% to about 5% bwoc of an emulsifier selected from the group consisting of ethoxylated phenol, sodium salt of modified tall oil fatty amide, carboxylic acid terminated fatty polyamide, modified amidoamine, tall oil fatty acid, oxidized tall oil fatty amidoamine, ether carboxylic acid, and combinations thereof;

from about 0.01% to about 5% bwoc of a crosslinker to crosslink the resin, where the crosslinker comprises at least one amine group;

a cementitious and/or weighting agent;

from about 0.01% to about 0.5% bwoc of a retarder, where the retarder is selected from the group consisting of lignosulfonates, organic acids, phosphonic acid derivatives, copolymers of 2-acrylamido-2-methylpropane sulfonic acid ("AMPS") and unsaturated carboxylic acids, inorganic borate salts, and combinations thereof;

from about 0.1% to about 2.0% bwoc of a dispersant; and from about 0.001% to about 0.5% bwoc of a silicon-based defoamer, wherein the LCM composition has a thickening time of from about 3 hours than about 6 hours by reaching a Bearden consistency of 100 Bc in a lost circulation zone of 4000 psi.

11. The method of claim 10, further comprising thickening the LCM composition in the well.

12. The method of claim 11, where the LCM composition has a thickening time of from about 3 hours than about 5 hours by reaching a Bearden consistency of 70 Bc.

13. The method of claim 11, where the LCM composition has a density of from about 115 pounds per cubic foot (pcf) to about 150 pcf.

14. The method of claim 10, where the lost circulation zone is located at a depth of up to 15,000 feet.

* * * * *